(12) United States Patent
Wakitani et al.

(10) Patent No.: US 6,714,671 B1
(45) Date of Patent: Mar. 30, 2004

(54) METHOD OF DETECTING PATTERN DEFECTS

(75) Inventors: Koichi Wakitani, Osaka (JP); Noriaki Yukawa, Takaichi-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 498 days.

(21) Appl. No.: 09/587,225

(22) Filed: Jun. 2, 2000

(30) Foreign Application Priority Data

Jun. 2, 1999 (JP) .......................................... 11-154535

(51) Int. Cl.[7] .............................. G06K 9/00; G06K 9/48; G06K 9/68
(52) U.S. Cl. ....................... 382/149; 382/145; 382/147; 382/199; 382/218
(58) Field of Search ................................ 382/144, 145, 382/146, 147, 148, 149, 199, 217, 218, 219, 221

(56) References Cited

U.S. PATENT DOCUMENTS

| | | | | |
|---|---|---|---|---|
| 4,496,971 A | * | 1/1985 | West et al. ................. | 348/125 |
| 4,550,434 A | * | 10/1985 | Shimada et al. ............ | 382/144 |
| 4,692,943 A | * | 9/1987 | Pietzsch et al. ............ | 382/148 |
| 4,707,734 A | * | 11/1987 | Labinger et al. ............ | 382/149 |
| 4,860,371 A | * | 8/1989 | Matsuyama et al. ........ | 382/149 |
| 5,046,109 A | * | 9/1991 | Fujimori et al. ............ | 382/144 |
| 5,272,763 A | * | 12/1993 | Maruyama et al. ......... | 382/147 |
| 5,301,248 A | * | 4/1994 | Takanori et al. ............ | 382/147 |
| 5,309,108 A | * | 5/1994 | Maeda et al. ................ | 324/501 |
| 5,574,800 A | * | 11/1996 | Inoue et al. ................ | 382/149 |
| 5,694,481 A | * | 12/1997 | Lam et al. .................. | 382/145 |
| 5,912,984 A | * | 6/1999 | Michael et al. ............. | 382/149 |
| 5,930,382 A | * | 7/1999 | Irie et al. .................... | 382/147 |
| 6,427,024 B1 | * | 7/2002 | Bishop ....................... | 382/149 |
| 6,539,106 B1 | * | 3/2003 | Gallarda et al. ............ | 382/149 |
| 6,608,922 B1 | * | 8/2003 | Matsushita .................. | 382/147 |

FOREIGN PATENT DOCUMENTS

JP          62131391 A   *   6/1987   ............ G06K/9/62

* cited by examiner

*Primary Examiner*—Jingge Wu
*Assistant Examiner*—Ryan J. Hesseltine
(74) *Attorney, Agent, or Firm*—Jordan and Hamburg LLP

(57) ABSTRACT

An input subject pattern is compared with a good product pattern that is registered beforehand, and a different portion of these is detected as a defect pattern. The detected defect pattern is classified in accordance with the features of the contour of the defect pattern.

7 Claims, 10 Drawing Sheets

Fig. 8

| 1 | 1 | 0 | 0 | 0 | 0 | 1 |
|---|---|---|---|---|---|---|
| 1 | 1 | 0 | 0 | 0 | 0 | 1 |
| 1 | 1 | 0 | 0 | 0 | 0 | 1 |
| 1 | 1 | 0 | 0 | 0 | 0 | 1 |
| 1 | 1 | 0 | 0 | 0 | 0 | 1 |
| 1 | 1 | 0 | 0 | 0 | 0 | 1 |
| 1 | 1 | 0 | 0 | 0 | 0 | 1 |

Fig. 13
Fig. 14
Fig. 15
PRIOR ART
Fig. 16A
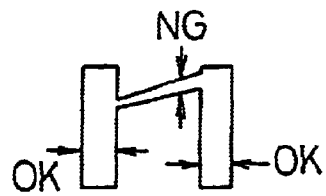
PRIOR ART
Fig. 16B
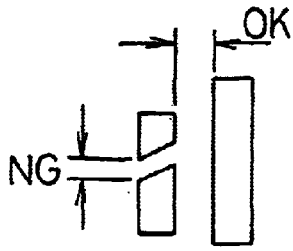

METHOD OF DETECTING PATTERN DEFECTS

BACKGROUND OF THE INVENTION

1. Technical Field of the Invention

In the examination of patterns such as the wiring patterns of semiconductors, printed circuit boards, liquid crystals, or plasma display panels etc or printed/impressed patterns, the present invention relates to a method of detecting pattern defects whereby defects are classified and detected.

2. Description of Related Art

Conventional methods of detecting pattern defects include the design rule check (DRC) method and the comparison method. The DRC method involves detecting the pattern line width and pattern separation by image processing. If the detected line width or pattern separation as respectively shown in FIG. 16A and FIG. 16B is not in accordance with certain wiring or pattern rules, such is determined as a pattern defect. In the example shown in FIGS. 16A and 16B, the line width and the pattern separation are both smaller than predetermined values, and therefore are detected as failures. The comparison method involves comparing a subject image S that is input with the previously registered image of a good product G, and detecting the difference of these as a defect pattern D, as shown in FIG. 17.

However, with the DRC method, as long as the detected line width or pattern separation satisfies certain rules, the pattern is determined normal. For example, in such a case as shown in FIGS. 18A and 18B, a bridge or a slit in the pattern cannot be detected as defects. On the other hand, normal patterns may be detected as failures if they contravene the pattern rules. For example, the separation P shown in FIG. 19A or the line width Q shown in FIG. 19B may be detected as a pattern defect.

With the comparison method, minute differences between the subject image and the registered image of a good product cannot be distinguished from noise etc, and so minute defects cannot be detected. Moreover, crucial defects such as a bridge D2 shown in FIG. 20 cannot be differentiated from permissible defects such as protuberance D1 shown in FIG. 20.

SUMMARY OF THE INVENTION

In view of the above, an object of the present invention is to provide a method of detecting pattern defects that is capable of classifying and reliably detecting various pattern defects.

A method of detecting pattern defects according to the resent invention involves comparing an input subject pattern with a good product pattern that is registered beforehand, in which a different portion of the good product pattern and subject pattern is detected as a defect pattern, and the defect pattern is classified and detected in accordance with the features of the contour of the defect pattern. Pattern defects of various types such as for example bridges, breaks, residual patterns, missing patterns, projection/protrusion, nicks/intrusion etc can reliably be detected and classified.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

FIG. 8 is a diagram of an image of a good product in image processing in this embodiment;

FIG. 9 is a diagram of a subject image in image processing in this embodiment;

FIG. 10 is a diagram of a comparison image in image processing in this embodiment;

FIG. 11 is a diagram of a contour line relating exclusively to a subject in image processing in this embodiment;

FIG. 12 is a diagram of contact points in image processing in this embodiment;

FIG. 13 is a diagram showing the case of occurrence of two contact points in image processing in this embodiment;

FIG. 14 is a diagram showing the case of occurrence of four contact points in image processing in this embodiment;

FIG. 15 is a diagram of defect classification in image processing in this embodiment;

FIGS. 16A and 16B are diagrams of the DRC method, which is a conventional pattern defect detection method;

DESCRIPTION OF PREFERRED EMBODIMENTS

Preferred embodiments of a method of detecting pattern defects according to the present invention are described below with reference to FIG. 1 to FIG. 15.

Figure 1:
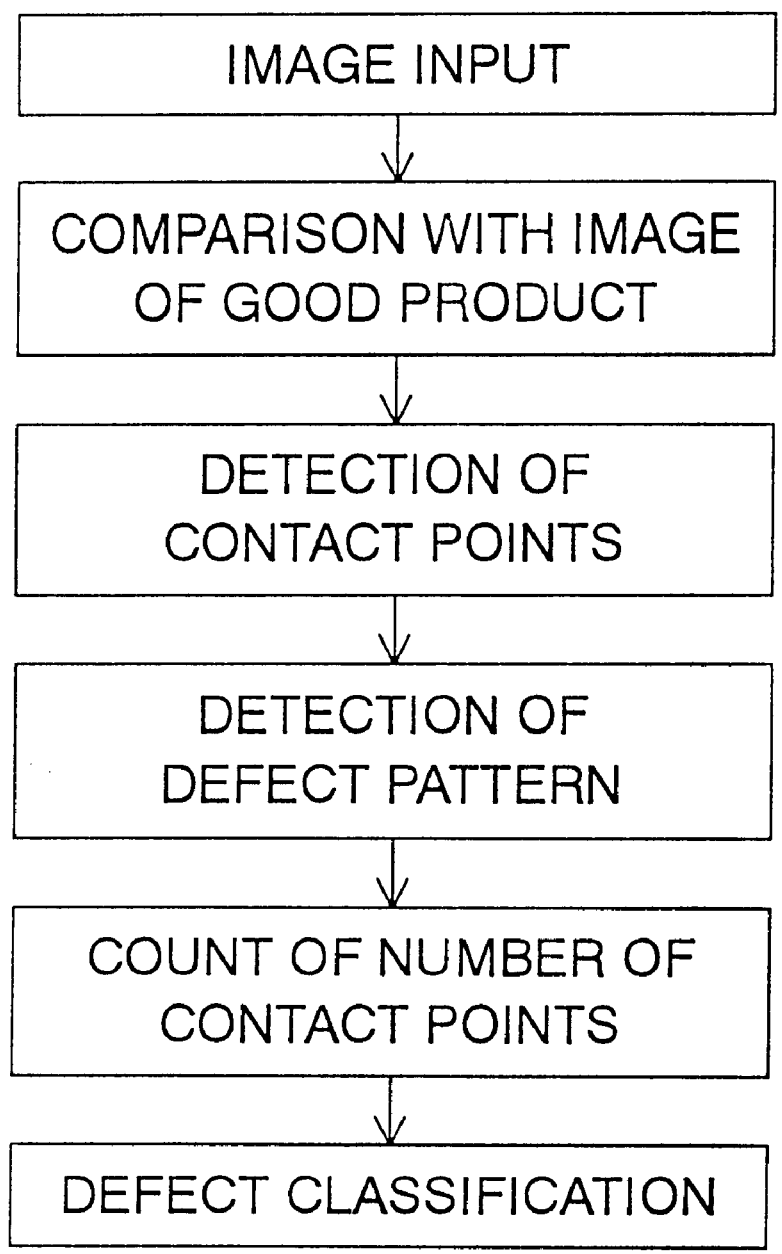
FIG. 1 is a flow chart of a method of detecting pattern defects according to one embodiment of the present invention.

FIG. 1 is a flow chart of a method of detecting pattern defects according to this embodiment. The method comprises: a step of inputting a subject pattern image; a step of comparing the subject pattern image with the image of a good product pattern that has been previously registered; a step of detecting outline points on the contour of one or other of the good product pattern and the subject pattern not overlapping with the other; a step of extracting contact points from the outline points, which are not in contact with two or more of the other outline points; a step of detecting as a defect pattern a continuous region where there is no mutual overlap between the subject pattern and the good product pattern; a step of counting the number of contact points contained in the defect pattern; and a step of classifying and detecting defects in accordance with the number of the contact points. A specific description is given below with reference to FIG. 2 to FIG. 7.

Figure 2A:
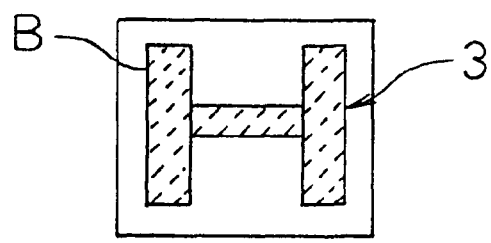
FIG. 2A to FIG. 2E are diagrams given in explanation of detection of a bridge defect.
Figure 2B:
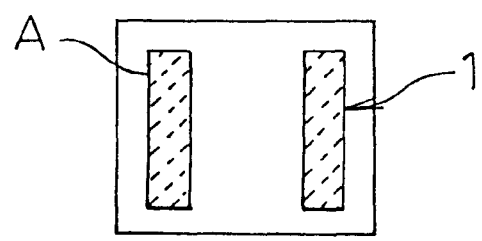
Figure 2C:
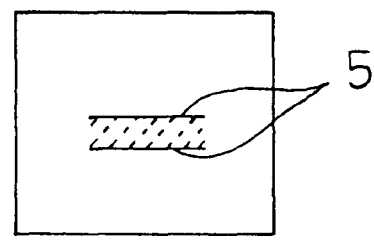
Figure 2D:
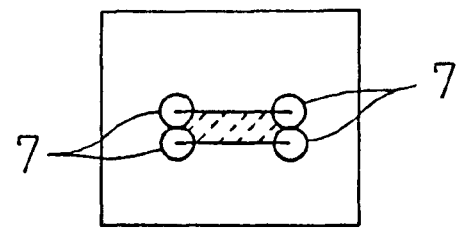
Figure 2E:
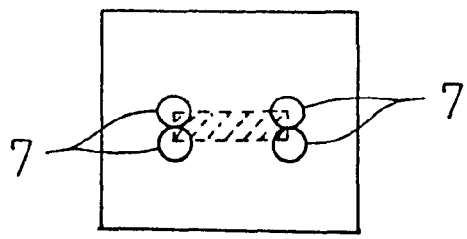

FIGS. 2A through 2E show a case where a pattern defect is detected as a bridge. FIG. 2A shows an input image B of a subject pattern 3 that is to be inspected and FIG. 2B shows an image A of a corresponding good product pattern 1 that is registered beforehand. FIG. 2C shows the contour 5 of a region of the subject pattern B that does not overlap with the good product pattern A, detected by comparing both images, and this region is determined as a defect pattern. FIG. 2D shows the end points 7 of the contour 5 of the defect pattern, as indicated by circles. The end points 7 are the points on the contour 5 of the defect pattern that make point contact with the good product pattern A, and these are determined as contact points. FIG. 2E shows the detected defect pattern with the contact points 7. Based on the fact that this defect pattern contains four contact points, it is detected, for example, as a bridge, or a "defect in which patterns which ought to be isolated are connected."

Figure 3A:
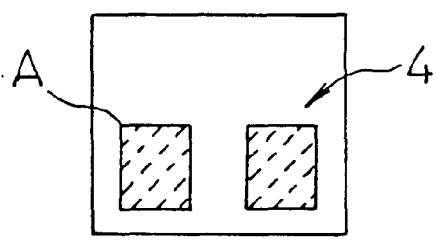
FIG. 3A to FIG. 3E are diagrams given in explanation of detection of a break defect.
Figure 3B:
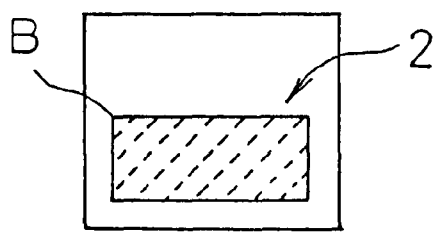
Figure 3C:
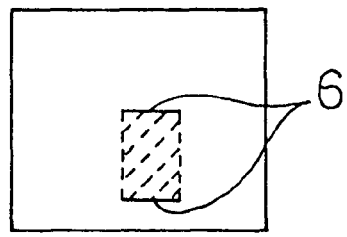
Figure 3D:
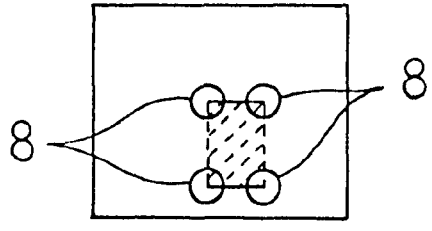
Figure 3E:
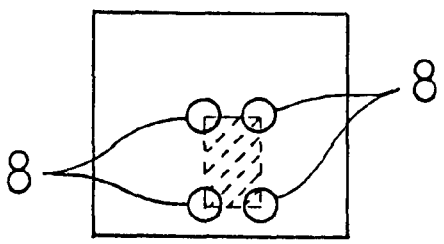

FIGS. 3A through 3E show a case where a pattern defect is detected as a break. FIG. 3A shows an input image A of a subject pattern 4 that is to be inspected and FIG. 3B shows an image B of a corresponding good product pattern 2 that is registered beforehand. FIG. 3C shows the contour 6 of a region of the good product pattern B that does not overlap with the subject pattern A, detected by comparing both images, and this region is determined as a defect pattern. FIG. 3D shows the end points 8 of the contour 6 of the defect pattern, as indicated by circles. The end points 8 are the points at the ends of the contour 6 of a region of the good product pattern B not overlapping the subject pattern A, that make point contact with the subject pattern B, and these are determined as contact points. FIG. 3E shows the detected defect pattern with the contact points 8. Based on the fact that this defect pattern contains four contact points, it is detected, for example, as a break, or a "defect in which patterns which ought to be connected are isolated."

Figure 4A:
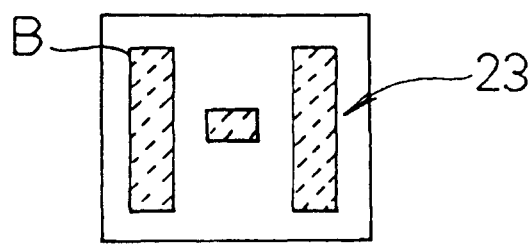
FIG. 4A to FIG. 4C are diagrams given in explanation of detection of an island defect.
Figure 4B:
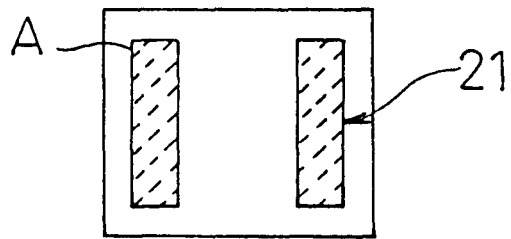
Figure 4C:
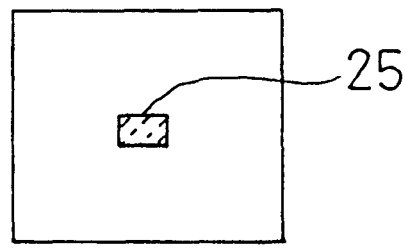

FIGS. 4A through 4C show a case where a pattern defect is detected as an island. FIG. 4A shows an input image B of a subject pattern 23 that is to be inspected and FIG. 4B shows an image A of a corresponding good product pattern 21 that is registered beforehand. FIG. 4C shows the contour 25 of a region of the subject pattern B that does not overlap with the good product pattern A, detected by comparing both images, and this region is determined as a defect pattern. Since there are no end points in the contour 25 of the detected defect pattern that make contact with the good product pattern A, the defect pattern is detected, for example, as an island, or a "defect in which an isolated pattern exists in a region in which no pattern ought to exist."

Figure 5A:
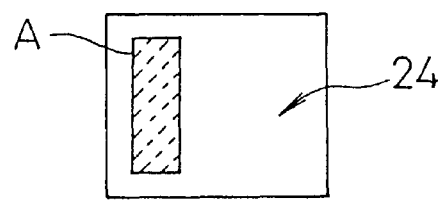
FIG. 5A to FIG. 5F are diagrams given in explanation of detection of a pin hole defect or missing pattern.
Figure 5B:
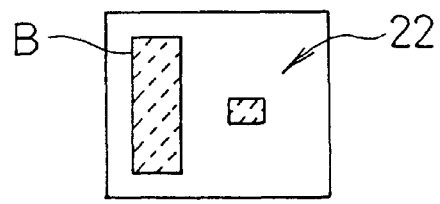
Figure 5C:
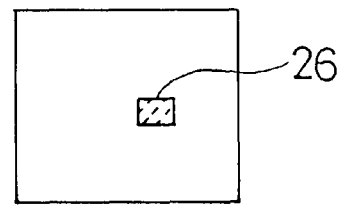

FIGS. 5A through 5C show a case where a defect is detected as pattern missing. FIG. 5A shows an input image A of a subject pattern 24 that is to be inspected and FIG. 5B shows an image B of a corresponding good product pattern 22 that is registered beforehand. FIG. 5C shows the contour 26 of a region of the good product pattern B that does not overlap with the subject pattern A, detected by comparing both images, and this region is determined as a defect pattern. Since there are no end points in the contour 26 of the detected defect pattern that make contact with the subject pattern A, the defect pattern is detected, for example, as a pattern missing defect, or a "defect in which a pattern which ought to exist in certain region does not exist."

Figure 5D:
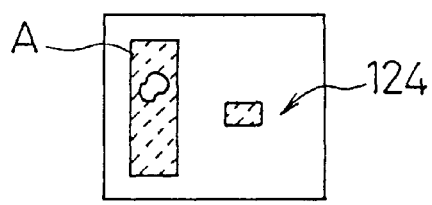
Figure 5E:
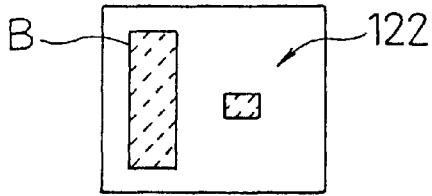
Figure 5F:
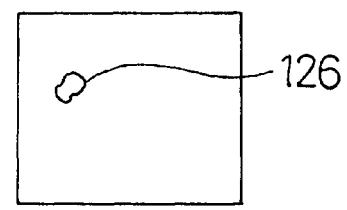

FIGS. 5D through 5F show a case where a defect is detected as a pin hole defect. FIG. 5D shows an input image A of a subject pattern 124 that is to be inspected and FIG. 5E shows an image B of a corresponding good product pattern 122 that is registered beforehand. FIG. 5F shows the contour 126 of a region of the good product pattern B that does not overlap with the subject pattern A, detected by comparing both images, and this region is determined as a defect pattern. Since there are no end points in the contour 126 of the detected defect pattern that make contact with the subject pattern A, the defect pattern is detected, for example, as a pin hole defect, or a "defect in which a portion of a pattern is missing."

Figure 6A:
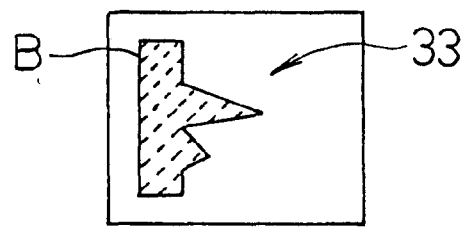
FIG. 6A to FIG. 6E are diagrams given in explanation of detection of a projection/protrusion defect.
Figure 6B:
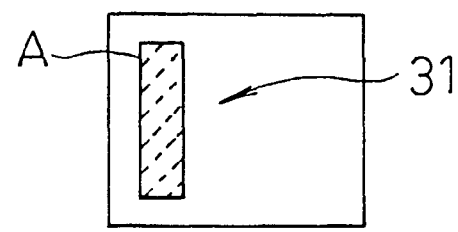
Figure 6C:
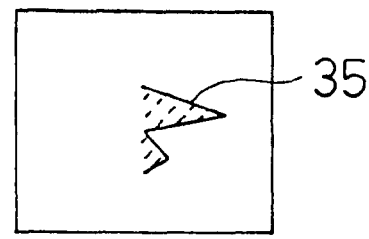
Figure 6D:
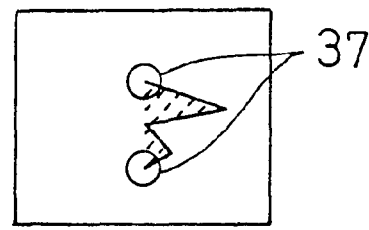
Figure 6E:
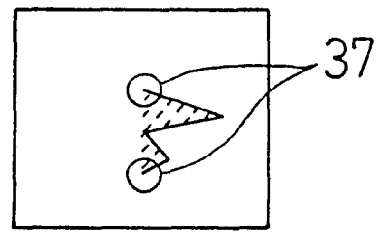

FIGS. 6A through 6E show a case where a defect is detected as a projection/protrusion pattern defect. FIG. 6A shows an input image B of a subject pattern 33 that is to be inspected and FIG. 6B shows an image A of a corresponding good product pattern 31 that is registered beforehand. FIG. 6C shows the contour 35 of a region of the subject pattern B that does not overlap with the good product pattern A, detected by comparing both images, and this region is determined as a defect pattern. FIG. 6D shows the end points 37 of the contour 35 of the defect pattern, as indicated by circles. The end points 37 are the points at the ends of the contour 35 of a region of the subject pattern B not overlapping with the good product pattern A, that make point contact with the good product pattern A, and these are determined as contact points. FIG. 6E shows the detected defect pattern with the contact points 37. Based on the fact that this defect pattern contains two contact points, it is detected, for example, as a projection/protrusion pattern defect, or a "defect in which a portion of the pattern is present projecting into a region where pattern ought not to be present."

Figure 7A:
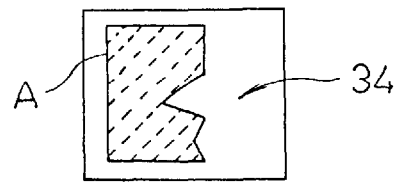
FIG. 7A to FIG. 7E are diagrams given in explanation of detection of a nick/intrusion defect.
Figure 7B:
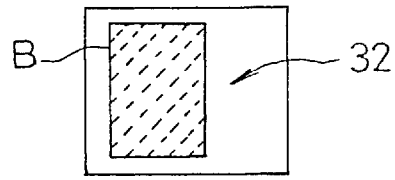
Figure 7C:
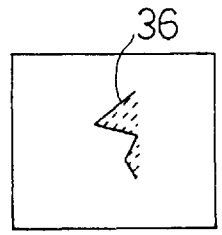
Figure 7D:
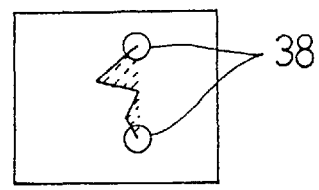
Figure 7E:
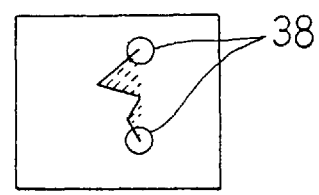
Figure 17:
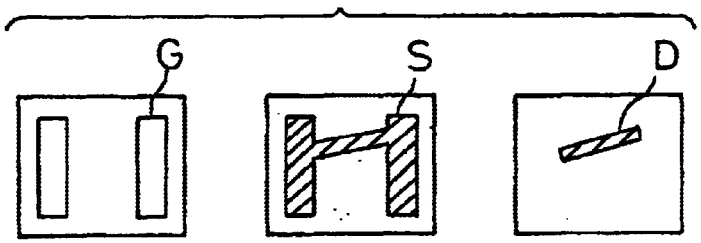
FIG. 17 is a diagram of the comparison method, which is another conventional pattern defect detection method.
Figure 18A:
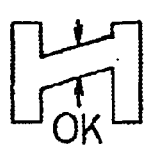
FIGS. 18A and 18B are diagrams of defects that cannot be detected by the conventional DRC method.
Figure 18B:
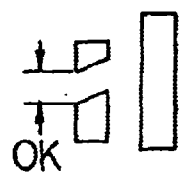
Figure 19A:
FIGS. 19A and 19B are diagrams of good product patterns which are detected as defects by the conventional DRC method.
Figure 19B:
Figure 20:
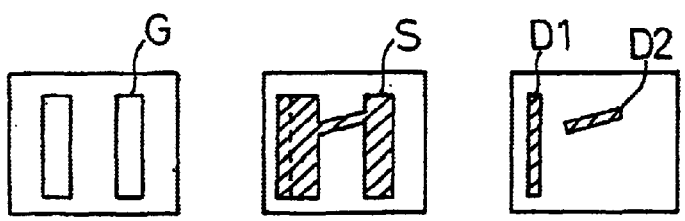
FIG. 20 is a diagram given in explanation of problems of the conventional comparison method.

FIGS. 7A through 7E show a case where a defect is detected as a nick/intrusion defect. FIG. 7A shows an input image A of a subject pattern 34 that is to be inspected and FIG. 7B shows an image B of a corresponding good product pattern 32 that is registered beforehand. FIG. 7C shows the contour 36 of a region of the good product pattern B that does not overlap with the subject pattern A, detected by comparing both images, and this region is determined as a defect pattern. FIG. 7D shows the end points 38 of the contour 36 of the defect pattern, as indicated by circles. The end points 38 are the points that are on the contour 36 of the defect pattern and in contact with the good product pattern B, and these are determined as contact points. FIG. 7E shows the detected defect pattern with the contact points 38. Based on the fact that this defect pattern contains two contact points, it is detected, for example, as a nick/intrusion defect, or a "defect in which a region other than a pattern is present projecting into a region where the pattern ought to be present."

Figures 9, 10, 11, 12:
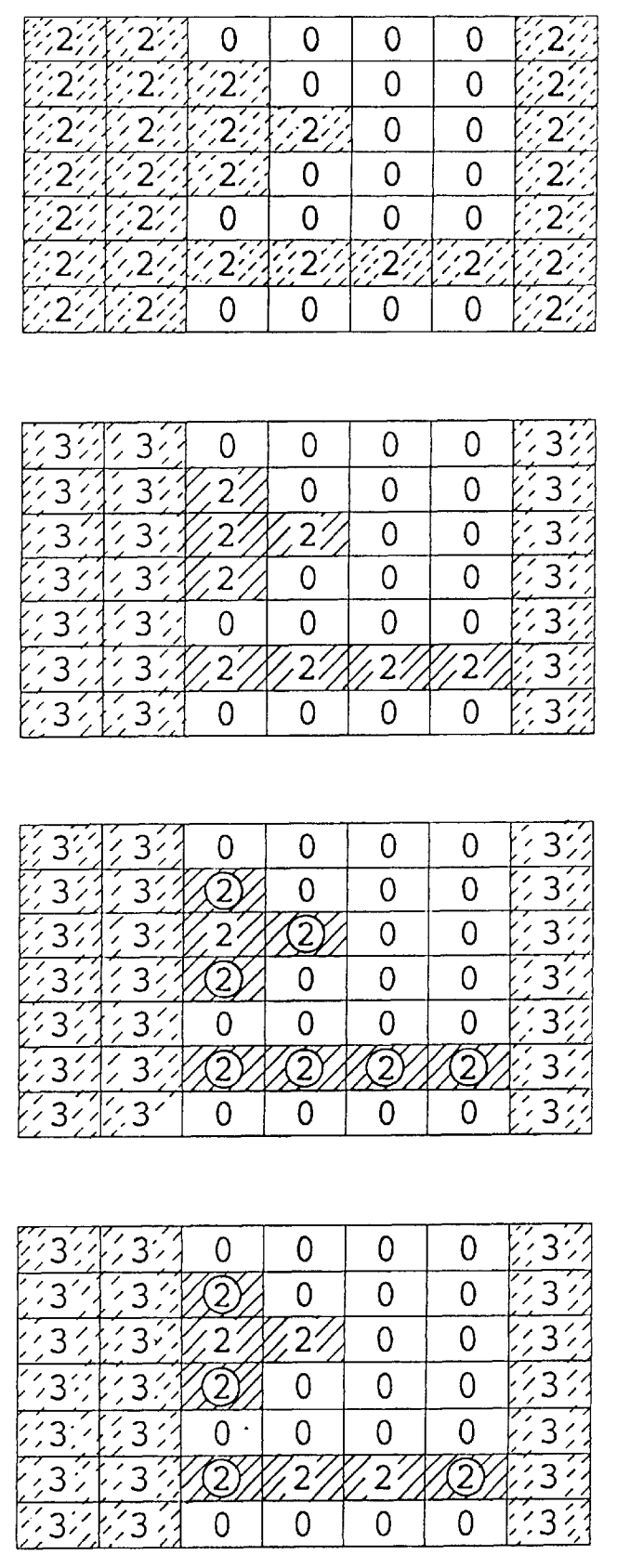

Next, the process whereby the method of defect detection described above is performed by image processing will be described. FIG. 8 shows the image of a good product pattern and FIG. 9 shows the image of a subject pattern. FIG. 10 shows an image obtained by comparing these two images. In these Figures, pixels indicated by the value 0 are pixels where neither the good product pattern nor the subject pattern are present; pixels indicated by the value 1 are pixels where only the good product pattern is present; pixels indicated by the value 2 are pixels where only the subject pattern is present; and pixels indicated by the value 3 are pixels where both the good product pattern and the subject pattern are present.

In FIG. 11, the pixels denoted at encircled numeral 2 are pixels in which only subject pattern is present and in which no subject pattern is present at their peripheries; they therefore constitute outline pixels or the contour of a region of the subject pattern that does not overlap with the good product pattern. The regions defined by these outline pixels are determined as defect patterns. In FIG. 12, only the pixels that are not in contact with two or more of the other outline pixels are denoted at encircled numeral 2, and they are determined as contact point pixels.

Referring now to FIG. 13, the two contact point pixels each contain one contact point, indicated by black dots, that are the points in the external contour of the contact point pixels and are in contact with the adjacent pixels indicated by the value 3 where both the good product pattern and the subject pattern are present. In FIG. 14, the contact point pixels denoted at encircled numeral 2 have two contact points each, indicated by black dots, making a total of four contact points. Consequently, the region X in FIG. 15 includes a total of two contact points and so is classified in pattern inspection as a defect in the form of a projection, whereas since the region Y contains a total of four contact points, it is classified in the pattern inspection as a bridge defect.

Although in the above embodiment the description has assumed that the objects were circuit patterns or semiconductor patterns etc, the present invention can also be applied to inspection of patterns such as letters or symbols.

As will be clear from the above description, according to the method of detecting pattern defects of the present invention, a good product pattern is registered beforehand and the good product pattern and an input subject pattern are compared, the difference of these being detected as a defect pattern, and the type of defect pattern is classified and detected in accordance with the features of the contour of the defect pattern. Consequently, pattern defects of various types such as for example bridges, breaks, residual patterns, missing patterns, projection/protrusion, nicks/intrusion etc can reliably be detected and classified.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A method of detecting pattern defects comprising:
comparing an image of an input subject pattern with an image of a good product pattern that is registered beforehand;
detecting a continuous region of the subject pattern that does not overlap with the good product pattern as a defect pattern;
extracting a line segment of the defect pattern that coincides with a contour of the subject pattern;
detecting all open end points of the line segment; and
detecting the defect pattern as a defect in which a pattern that ought to be isolated is connected when the defect pattern contains four or more of the open end points.

2. A method of detecting pattern defects comprising:
comparing an image of an input subject pattern with an image of a good product pattern that is registered beforehand;
detecting a continuous region of the good product pattern that does not overlap with the subject pattern as a defect pattern;
extracting a line segment of the defect pattern that coincides with a contour of the good product pattern;
detecting all open end points of the line segment;
detecting the defect pattern as a defect in which a pattern that ought to be connected is isolated when the defect pattern contains four or more of the open end points.

3. A method of detecting pattern defects comprising:
comparing an image of an input subject pattern with an image of a good product pattern that is registered beforehand;
detecting a continuous region of the good product pattern that does not overlap with the subject pattern as a defect pattern;
extracting a line segment of the defect pattern that coincides with a contour of the good product pattern;
detecting all open end points of the line segment;
detecting the defect pattern as a defect in which a region is present projecting into a region where the input subject pattern ought not to be present when the defect pattern contains two or more of the open end points.

4. A method of detecting pattern defects comprising:
comparing an image of an input subject pattern with an image of a good product pattern that is registered beforehand;
detecting a continuous region of the good product pattern that does not overlap with the subject pattern as a defect pattern;
extracting a line segment of the defect pattern that coincides with a contour of the good product pattern;
detecting all open end points of the line segment;
detecting the defect pattern as a defect in which a region is present projecting into a region where the good product pattern is present when the defect pattern contains two or more of the open end points.

5. The method of detecting pattern defects according to any one of claims 1–4, wherein the pattern is a circuit pattern.

6. The method of detecting pattern defects according to any one of claims 1–4, wherein the pattern is a semiconductor pattern.

7. The method of detecting pattern defects according to claim 6, wherein the pattern is for liquid crystal display panels.

* * * * *